April 1, 1952  L. COOPER  2,591,338
FISHING REEL
Filed March 29, 1947
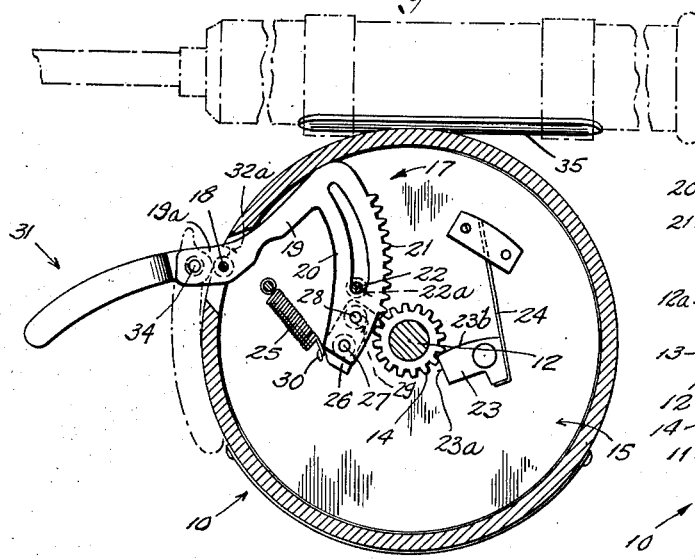
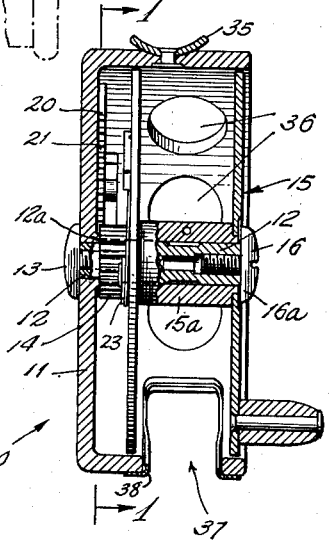
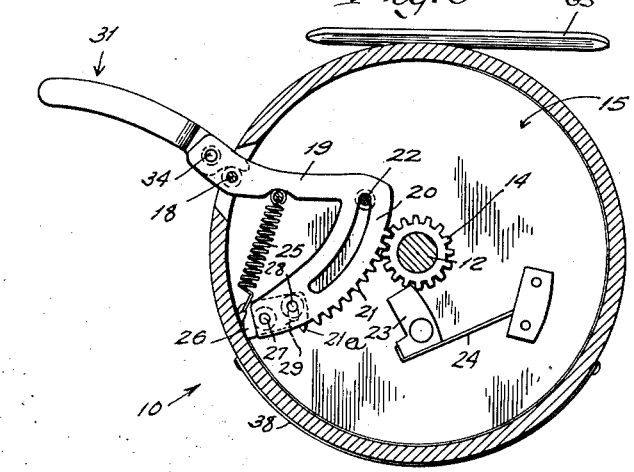
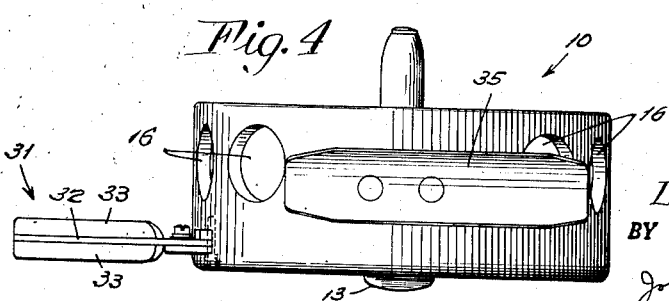
INVENTOR.
Leo Cooper
BY
Johnson and Kline
ATTORNEYS Patented Apr. 1, 1952

2,591,338

UNITED STATES PATENT OFFICE 2,591,338

FISHING REEL

Leo Cooper, Stamford, Conn., assignor to P & K Incorporated, a corporation of Illinois Application March 29, 1947, Serial No. 738,140

7 Claims. (Cl. 242—84.6)

1

This invention relates to fishing reels and particularly to fishing reels of the fly rod type, in which the reel is provided with trigger operated means for quickly and conveniently taking up the slack in the line.

The fishing reel of the present invention is simple in design, reliable in operation, and economical to make, and has a minimum number of parts which are light in weight and easy to assemble.

In carrying out the invention, a single gear wheel is disposed between the casing and the spool and the spool is provided with a pawl for engaging the gear to provide the one-way drive between the gear and spool when the gear is rotated in winding-in direction; and a single one-piece driver having a gear segment is employed to cooperate with the gear wheel in all operative positions of the segment for rotating the spool in winding-in direction and for controlling the unwinding of the spool.

The single driver is preferably made of a stamping of sheet metal and has the gear segment projecting laterally from the driver arm so that the resiliency of the sheet metal segment controls the amount of drag applied to the spool and also provides for holding the spool against rotation during the unwinding of the spool.

This feature of the invention is particularly advantageous in playing a fish and in lifting a fish from the water by holding the spool against unwinding.

According to the present invention, the tooth of the segment normally engaging the gear is made as a yieldable tooth in order to provide for normal click or drag during the unwinding of the spool.

A feature of the invention is to be found in the use of a single spring for urging the driver member to normal position and also urging the click tooth into engagement with the gear wheel.

A further feature of the invention resides in the simplicity of the reel in both the mechanical structure and in the arrangement wherein it may be assembled with a simple number of operations and produces an inexpensive, lightweight reel.

Another feature of the invention resides in the provision of a novel foldable trigger connected to the drivng member so that in normal operating position, the trigger will project beyond the casing to be readily engaged by the finger, while when in inoperative position it will fold down on the casing and be in an out-of-the-way position.

Further features and advantages of the invention will be apparent from the specification and claims considered in connection with the drawings, in which:

Figure 1 shows a longitudinal section of the reel taken along lines 1—1 of Fig. 2 with the driver in normal position.

Fig. 2 is a view partly in section showing the relative position of the gear, spool and casing and the driving elements thereon.

Fig. 3 is a sectional view similar to that of Fig. 1 showing the driving element at the end of a driving operation.

Fig. 4 is a plan view of the reel.

As shown in the drawings, the reel of the present invention comprises a casing 10 open at one end and having an end wall 11, in which is mounted a shaft 12. The shaft is preferably mounted by having a clamping screw 13 threaded in the end thereof to draw a shoulder 12a on the shaft into engagement with the end wall. A driving gear 14 is rotatably mounted on the shaft adjacent the wall and a spool 15 having a line-receiving barrel 15a and flanges 15b is rotatably mounted on the shaft and closes the open end of the casing. The spool is locked against removal from the shaft by a screw 16 threaded into the end of the shaft and having its head 16a overlying an adjacent spool flange. A driving member 17 is pivotally mounted by pivot pin 18 on the casing, as shown in Fig. 1, and preferably comprises an arm 19 stamped from sheet metal. In the herein illustrated form of the invention, an integral, relatively narrow extension 20 projects laterally from the arm and is provided on its outer surface with gear teeth 21 so as to form a gear segment adapted to drivingly engage the driving gear 14. The driving member has limited arcuate movement within the casing and is guided in its movement by a guide pin 22 positioned in an arcuate slot in the extension 20. A head 22a is provided on the pin to act as a restraining member for retaining the driving segment in close proximity to the end wall.

As will be noted from the position of the segment in Figs. 1 and 3, the teeth of the driving element are in engagement with the driving gear in all positions of operation thereof.

According to the present invention the spool is provided with a simple one-way drive connection with the gear which enables the spool to continue rotation in winding-in direction after the gear has stopped rotating in said direction or is reversed by action of the driving member and which enables the spool to drive the gear when the spool is rotated in unwinding direction. In providing this simplified drive, the spool has a pawl 23 pivoted to the flange adjacent the gear and normally biased by a light spring 24 on the flange into engagement with the teeth on the driving gear 14. The pawl is so arranged that when the gear 14 is driven in winding-in direction its teeth will act on the face 23a and drive the spool and when the gear is stopped by the drive, as when it reaches the position of Fig. 3, the inertia of the spool will continue to rotate it as the surface 23b of the pawl rides over the teeth. Because of this direct drive a maximum amount of energy can be transmitted to the spool to spin the same and take up the slack.

When the line is played out and the spool rotated in unwinding direction, the face 23a of the pawl will engage the teeth and rotate the gear. This will apply a drag or resistance to unwinding of the spool as will be explained.

The driver is urged to its normal position, as shown in Fig. 1, by a spring 25. In normal position, the tooth at the free end of the segment is in engagement with the gear and the resiliency of the extension permits the gear teeth to snap past the said segment tooth as the gear is driven by the spool in unwinding of the line therefrom and apply a drag to the line.

As the gear segment is moved from its normal position to the position shown in Fig. 3, the lever arm of the resilient extension will gradually shorten and thus increase the pressure of the gear teeth on the extension against the gear teeth on the driving gear, thus varying the amount of drag which can be applied to the spool until, in the position in Fig. 3, the extension has practically no yield and the gear is locked against rotation.

For normal unwinding of the spool, however, it is preferred to have a lighter drag than might be produced by the pressure of the extension. This has been accomplished by yieldably mounting the segment tooth 21a which engages the gear in the normal position of the arm and forms the click or drag during unwinding of the spool. As herein illustrated the tooth 21a is formed on a plate 26 which is pivoted to the free end of the extension by pivot pin 27 and limited in its movement by pin 28 operating in a slot 29 formed in the plate. The plate has a hook 30 thereon to which is connected the end of spring 25 which urges the tooth in the direction to engage the gear. It will therefore be seen that one spring serves to return the driving member to normal position and to urge the click or drag tooth 21a of the segment into position to engage the gear. This spring is so arranged that in normal position, Fig. 1, it has a minimum of tension therein and produces a light yielding pressure of the click tooth on the gear, but as the arm is moved during the power operating stroke the spring is stretched and the tension increased to return the driver to normal position.

The driving arm is provided with a novel actuating trigger. As shown in Fig. 1, the driving arm has a portion 19a which projects beyond the pivot pin. A trigger 31, which may comprise a plate 32 having shells 33 secured thereon, is pivotally mounted by pivot 34 to the projecting portion and is movable about the pivot from a retracted or inoperative position, as shown in dot-and-dash lines to an extended or operative position. The plate 32 is provided with a tail 32a which cooperates with the pivot 18 to limit its movement and hold it in position in which a force applied toward the rod in Fig. 1 will drive the arm in winding-in direction and will effectively hold the arm in its various required positions for producing a variable drag or for holding the spool against unwinding.

In mounting the reel, a novel arrangement has been provided wherein the reel is secured to a mounting plate 35 at a point forward of the center, thus providing a better support for the reel during actuation of the trigger in driving the reel in its winding-in direction.

The sides of the reel are provided with openings 36 and 37, opening 37 being located at the bottom of the reel to receive the line as it is wound in. If desired, the edges of the opening can be covered with a hard smooth liner 38, preferably of metal, which will protect the line as it is wound and unwound from the reel.

It will be apparent from the foregoing description that I have provided a highly efficient reel having a few, simple parts which can be readily manufactured and assembled, thus producing a relatively inexpensive and lightweight reel.

Variations and modifications may be made within the scope of this invention and portions of the improvements may be used without others.

I claim:

1. A fishing reel comprising a casing having an end wall; a shaft mounted on said wall; a spool rotatably disposed on said shaft; a gear rotatably mounted on the shaft and disposed between the wall and the spool; a driver pivoted to the casing and having a gear segment thereon and drivingly engaging the teeth of the gear in all operative positions; and a pawl carried by the spool and engaging the teeth of the gear to provide a one-way drive for the spool when the gear is driven in winding-in direction, said one-way drive enabling the spool to continue turning in said winding-in direction after rotation of the gear in said direction ceases.

2. A fishing reel comprising a casing having an end wall; a shaft mounted on said wall; a spool positioned in said casing and rotatably disposed on said shaft; a gear rotatably mounted on the shaft and disposed between the wall and the spool, a sheet metal driver pivoted to the casing and having a gear segment projecting laterally therefrom and drivingly engaging the teeth of the gear in all operative positions, the free end of the segment having a tooth normally yieldingly engaging the gear to provide a drag thereon; and a pawl carried by the spool and engaging the teeth of the gear to provide a one-way drive for the spool when the gear is rotated in winding-in direction, said one-way drive enabling the spool to continue turning in said winding-in direction after rotation of the gear in said direction ceases and driving the gear when the spool is rotated in unwinding direction.

3. A fishing reel comprising a casing having an end wall; a shaft mounted on said wall; a spool rotatably disposed on said shaft; a gear rotatably mounted on the shaft and disposed between the wall and the spool; a sheet metal driver arm pivoted to the casing and having an integral resilient gear segment projecting laterally therefrom and drivingly engaging the teeth of the gear in all operative positions, the projecting end of the segment being free and having a pivotally mounted tooth thereon; means normally yieldingly urging the driver into normal position wherein the said tooth is disposed to engage the gear and yieldingly urging the tooth into engagement with the gear to provide a normal drag thereon during rotation of the spool in unwinding direction, said segment having sufficient resiliency to yield and permit the gear to slip over the teeth thereof under load, to provide a varying drag, said drag increasing as the engagement between the gear and segment moves toward the driver arm; and a one-way drive between the gear and spool enabling the spool to continue turning in said winding-in direction after rotation of the gear in said direction ceases and driving the gear in unwinding direction when the spool is rotated in unwinding direction.

4. A fishing reel comprising a casing having an end wall; a shaft mounted on said wall; a spool rotatably disposed on said shaft; a gear rotatably mounted on the shaft and disposed between the wall and the spool; a driver pivoted to the casing and having a narrow resilient integral arm projecting laterally therefrom formed with a free end and provided with a gear segment thereon drivingly engaging the teeth of the gear in all operative positions thereof, said driver being normally positioned with the free end of the segment engaging the teeth of the gear and the arm having sufficient resiliency to yield and permit the gear to slip over the teeth of the gear segment under load, thereby providing a variable drag on the spool when the gear is rotated in unwinding direction which drag increases as the engagement between the gear and segment moves toward the driver; and a one-way drive enabling the spool to continue turning in a winding-in direction after rotation of the gear in said direction ceases and enabling the spool to drive the gear in unwinding direction.

5. A fishing reel comprising a casing having an end wall: a shaft mounted on said wall; a spool rotatably disposed on said shaft; a gear rotatably mounted on the shaft and disposed between the wall and the spool; a sheet metal driver pivoted to the casing and having an integral gear segment projecting laterally therefrom and having a free end, said segment drivingly engaging the teeth of the gear in all operative positions, said driver, in normal position, having the free end of the segment engaging the gear to provide a drag thereon, the tooth of the segment at the free end being pivoted to the segment and having a pin and slot connection therewith to limit the pivotal movement of the tooth about the pivot; means for urging the tooth into engagement with the gear; and a one-way drive between the gear and spool enabling the spool to continue turning in a winding-in direction after rotation of the gear in said direction ceases and driving the gear when the spool is rotated in unwinding direction.

6. A fishing reel comprising a casing having an end wall; a shaft mounted on said wall; a spool rotatably disposed on said shaft; a gear rotatably mounted on the shaft and disposed between the wall and the spool; a driver pivoted to the casing and having a gear segment thereon drivingly engaging the teeth of the gear in all operative positions thereon; a one-way drive between the gear and spool enabling the spool to continue turning in a winding-in direction after rotation of the gear in said direction ceases; a trigger pivotally connected to the driver and movable between an operative projecting position and an inoperative retracted position, said trigger being curved and lying close to the curved portion of the casing when in retracted position; a mounting plate for mounting the reel on a rod; and means for securing said reel to said plate forwardly of the center thereof and in the direction of the trigger.

7. A fishing reel comprising a casing having an end wall; a shaft mounted on said wall; a spool rotatably disposed on said shaft; a gear rotatably mounted on the shaft and disposed between the wall and the spool; a driver pivoted to the wall of the casing and having a gear segment thereon drivingly engaging the teeth of the gear in all operative positions thereon, said driver having a portion projecting beyond the pivot; a one-way drive between the gear and the spool enabling the spool to continue turning in a winding-in direction after rotation of the gear in said direction ceases; and a trigger pivotally connected to the projecting portion of the driver and having a tail engaging the pivot for the driver to position the trigger in an operative projecting position.

LEO COOPER.

REFERENCES CITED

The following references are of record in the file of this patent:

UNITED STATES PATENTS

| Number | Name | Date |
|---|---|---|
| 150,883 | Orris | May 12, 1874 |
| 873,784 | Reichardt | Dec. 17, 1907 |
| 1,279,516 | Collins | Sept. 24, 1918 |
| 1,308,363 | Kuehne et al. | July 1, 1919 |
| 1,869,441 | Shakespeare, Jr. | Aug. 2, 1932 |
| 2,180,566 | Thompson | Nov. 21, 1939 |
| 2,340,892 | Maynes | Feb. 8, 1944 |
| 2,428,908 | Cooper et al. | Oct. 14, 1947 |
| 2,438,287 | Hypnarowski | Mar. 23, 1948 |

FOREIGN PATENTS

| Number | Country | Date |
|---|---|---|
| 22,420 of 1912 | Great Britain | Oct. 2, 1913 |